United States Patent [19]

Morioka et al.

[11] Patent Number: 4,582,767

[45] Date of Patent: Apr. 15, 1986

[54] LEAD STORAGE BATTERY

[75] Inventors: Yuji Morioka; Sigeru Yamasita, both of Hyogo; Hiroyuki Miyata, Sumoto; Takahiko Ohama, Sumoto; Kazuhiro Uchiyama, Sumoto, all of Japan

[73] Assignee: Sanyo Electric Co., Ltd., Osaka, Japan

[21] Appl. No.: 709,174

[22] Filed: Mar. 7, 1985

[30] Foreign Application Priority Data

| Mar. 13, 1984 | [JP] | Japan | 59-48507 |
| Mar. 13, 1984 | [JP] | Japan | 59-48508 |
| Mar. 13, 1984 | [JP] | Japan | 59-48509 |
| Mar. 14, 1984 | [JP] | Japan | 59-50018 |

[51] Int. Cl.$^4$ ............................................. H01M 2/30
[52] U.S. Cl. .................................... 429/121; 429/163; 429/178; 429/225
[58] Field of Search ............... 429/162, 163, 178, 176, 429/175, 225, 121, 179

[56] References Cited

U.S. PATENT DOCUMENTS

| 4,123,598 | 10/1978 | Hammel | 429/178 X |
| 4,207,384 | 6/1980 | Peters et al. | 429/178 X |
| 4,237,198 | 12/1980 | Eby et al. | 429/178 X |
| 4,248,942 | 2/1981 | Eby et al. | 429/178 X |
| 4,265,984 | 5/1981 | Kaye | 429/178 |
| 4,444,853 | 4/1984 | Halsall et al. | 429/178 X |
| 4,448,863 | 5/1984 | Terrell | 429/178 |

FOREIGN PATENT DOCUMENTS

| 51-33828 | 3/1976 | Japan . |
| 58-159162 | 10/1983 | Japan . |
| 58-157969 | 10/1983 | Japan . |

Primary Examiner—Anthony Skapars
Attorney, Agent, or Firm—Wenderoth, Lind & Ponack

[57] ABSTRACT

A lead storage battery comprising a battery casing has a first case member (such as a tray) and a second case member (such as a cover) in a superposed relation. The tray has a protruding part for mounting one external terminal, and the cover has a protruding part for mounting the other external terminal. The tray and cover have recessed regions for receiving the protruding parts for mounting the external terminal of an opposing case member of the tray and the cover. The tray has a recessed region for holding a safety valve so that the safety valve is covered by the cover when the tray and the cover are superposed. A small hole is formed in the recessed region such that the small hole is connected with an interior of the battery casing.

9 Claims, 28 Drawing Figures

LEAD STORAGE BATTERY

BACKGROUND OF THE INVENTION

1. Field of the Invention

The present invention relates to a lead storage battery, and more specifically to a thin sealed type lead storage battery which is constituted by holding battery cells in a battery casing formed by superposing a pair of split cases.

2. Description of the Prior Art

Thin, sealed-type lead storage batteries of the above-mentioned type have been known as disclosed in, for example, Japanese Patent Laid-Open No. 33828/1976, Japanese Utility Model Laid-Open No. 159162/1983, and Japanese Utility Model Laid-Open No. 157969/1983. Lead storage batteries disclosed in these publications are briefly described below.

First, according to the lead storage battery disclosed in Japanese Patent Laid-Open No. 33828/1976, collectors and active material are arranged in a pair of split cases which are superposed under the condition in which separators are held in the active material. In this known lead storage battery, however, external terminals are protruded from the outer surfaces of split cases to take out the electric current from the collectors in the split cases to the units outside the battery. Therefore, the external terminals impose limitation on reducting the thickness of the battery, making it difficult to obtain batteries of desired thicknesses. In the lead storage batteries of this type, it is necessary to provide a safety valve for releasing gas. Thickness of the safety valve holding portion serves as another significant factor which imposes limitation on reducing the thickness of the batteries.

In the lead storage battery disclosed in Japanese Utility Model Laid-Open No. 159162/1983, the positive and negative electrode formed by adhering electro-collecting boards onto one side of the active material layer are contained in a battery casing made of a resin via separators, holes are formed in the wall of the battery casing opposed to the electro-collecting boards, through holes are formed in end portions of the battery casing, rivet fittings that serve as external terminals of the positive and negative electrode are attached to the through holes, and portions of the electro-collecting boards facing the holes and rivet fittings are connected via lead wires that run on the surface of the battery casing. However, the thus constructed lead storage battery has problems as described below. First, lead wires are connected by soldering to the electro-collecting boards or the rivet fittings. Therefore, the electro-collecting boards, lead wires, rivet fittings and the battery casing are damaged by the heat of soldering. Further, holes of the battery casing from where the lead wires are taken out, are sealed with a thermosetting resin such as an epoxy resin or the like. However, the holes are formed so shallow that there is no space for charging the epoxy resin in amounts sufficient to accomplish complete sealing. Therefore, the electrolyte in the battery casing often leaks from the sealed portions. Moreover, the rivet fittings that serve as external terminals assume the shape of a rod, and it is difficult in manufacturing the batteries to always secure the rod-like rivet fittings perpendicular to the plane of the battery casing. If the rivet fittings are tilted even by the slightest angle, complete electric contact is not obtained relative to the receiving terminals on the side of the electric equipment.

With the lead storage battery disclosed in Japanese Utility Model Laid-Open No. 157969/1983, electro-collecting boards composed of lead or a lead alloy are mounted with the battery casing, and the electrode plates consisting of synthetic resin nets carrying an active material are closely adhered onto the electro-collecting boards, to realize a laminated thin battery structure having a cross section consisting of battery casing, electro-collecting board, cathode layer, separator, positive electrode layer, electro-collecting board and battery casing. However, this lead storage battery has problems as described below. First, in the conventional batteries, the battery casing is warped by the contraction of resin after molding, marring the appearance, and causing the output of the battery casing to decrease. Therefore, discharge capacity of the battery decreases greatly through charge-discharge cycles of the battery, and the life of the battery is considerably shortened. Further, discharge capacity reduction varies greatly.

SUMMARY OF THE INVENTION

An object of the present invention is to provide a thin storage battery, the thickness, or miniaturization of which is limited neither by the external terminals through which the electric current is taken out from the collectors provided in the split cases constituting a battery casing to the units outside the battery nor by the safety valve holding portion.

Another object of the present invention is to provide a thin storage battery which facilitates securing the external terminals of the battery to the battery casing and connecting the external terminals to the electro-collecting boards. This arrangement improves the sealing function and property between the regions near the electro-collecting boards and the external terminals, and eliminates the probability of poorly mounting the external terminals and a poor electric contact relative to the receiving terminals of external equipment.

A further object of the present invention is to increase the resistance of the battery casing to warping after molding, to increase the yield of the battery casings, to prevent the battery life from being shortened by the electrolyte permeating onto the surfaces of the electro-collecting boards on the side of the battery casing, and to reduce variance in the battery discharge capacity in the charge-discharge cycles.

To achieve the above-mentioned objects, the present invention deals with a lead storage battery in which battery cells are contained in a battery casing formed by superposing a pair of split cases (i.e., a bottom tray and a cover), the improvement wherein the one split case is provided with a protruding portion for mounting one external terminal, the other split case is provided with a protruding portion for mounting the other external terminal. Each of these split cases is provided with a recessed portion into which will be introduced the protruding portion for mounting the external terminal of the opposing case when these split cases are superposed. In one split case, there is formed a recessed portion for holding a safety valve which will be covered by the other split case when the split cases are superposed. The recessed portion for holding the safety valve has a small hole which is formed in the inner wall thereof and is communicated with the interior of the battery casing. Being constructed as described above, the protruding portions for mounting the external terminals of the split cases and the recessed portions of the opposing cases offset the thickness relative to each other, enabling a very thin battery casing to be constructed. Moreover, the safety valve holding portion is formed by the superposition of the two split cases, making it possible to minimize the thickness of the safety valve holding portion. The battery can be made thinner without involvement of any limitation of the thickness of the external terminals or of the safety valve holding portion. Further, the protruded portions and recessed portions for mounting the external terminals also work as guide means for superposing the split cases.

In a preferred embodiment of the present invention, a groove is formed between the safety valve holding portion and the outer wall of the one split case. In the other split case, there is formed a protrusion that fits the groove when the split cases are superposed. The groove and the protrusion serve as guide means when the split cases are to be superposed.

In another preferred embodiment of the present invention, a small gap is maintained between the groove and the protrusion when the split cases are superposed, so that gas in the safety valve holding portion can be released.

In a further preferred embodiment of the present invention, an opening is formed in the protruding portions for mounting external terminals, to stretch a current tab which electrically connects the battery cells in the battery casing to the external terminals. According to this construction, the external terminals can be easily attached as will be mentioned in a subsequent embodiment.

In a still further preferred embodiment of the present invention, electro-collecting boards are provided in the battery casing, the electro-collecting boards having at the ends thereof tabs for taking out the electric current. The tabs for taking out the electric current face into the openings which are filled up with a thermosetting resin such as an epoxy resin. The external terminal is formed by folding a flat plate in nearly a U-shape, mounted on the protruded portion so as to cover the opening, and is electrically connected in the opening to the tab for taking out the electric current. With this construction, the electro-collecting boards can be electrically connected to the external terminals without thermally damaging the battery casing. Also, a space can be maintained for holding the resin in amounts sufficient to completely seal a portion between the external terminal and the tab for taking out the current that stretches from the interior of the battery casing. Moreover, since much thermosetting resin exists, it can be supplied in a measured amount to enhance the yield rate for sealing the batteries. Further, the external terminal can be mounted on the protruding region when the thermosetting resin is charged into the opening, thereby securing the external terminal and sealing the region between the interior of the battery casing and the external terminal in a single operation.

In another preferred embodiment of the present invention, the external terminal is provided with a cutout piece which is in contact with the tab for taking out the electric current. The cutout piece and the tab for taking out the current are welded together by bringing welding rods of a resistance welder into contact with the electro-collecting board and with the external terminal and by permitting the electric current to flow therethrough. In this construction, the tab for taking out the current and the erect piece are connected in the thermosetting resin. Therefore, electrically connecting the external terminal to the electro-collecting board, fitting the external terminal to the protruding part, securing the external terminal, and sealing the region between the interior of the battery casing and the external terminal, can be performed in a single step.

In another preferred embodiment of the present invention, the split case made of a synthetic resin is provided with electro-collecting boards in such a manner that the peripheries of the electro-collecting boards are molded in the split case. The peripheral ends of the electro-collecting boards are bent toward the inside of the battery casing. Being constructed as described above, the battery casing provide effective resistance against warping after the molding, thereby increasing the production efficiency or yield rate of the battery casing. This construction also prevents the battery life from being shortened by the electrolyte permeating onto the surfaces of the electro-collecting boards on the side of the battery casing, and effectively reduces variance in the battery discharge capacity in the charge-discharge cycles. By applying a water-repellent coating to the peripheries of the electro-collecting boards, the electrolyte is almost completely prevented from permeating, and the above-mentioned inconveniences resulting from the permeation of the electrolyte can be effectively eliminated. A water-repellent or a hydrophobic material is applied to desired portions. Any material can be used as the water-repellent or hydrophobic material, provided that it does not adversely affect the storage battery. An organic hydrophobic material can be used, such as fluorine-contained resin dispersion, silicone rubber, silicone oil, polybutene, or the like.

The water-repellent or hydrophobic material can be adhered coating, printing or any other known technique.

DETAILED DESCRIPTION OF THE PREFERRED EMBODIMENTS

Embodiment 1

Figure 1:
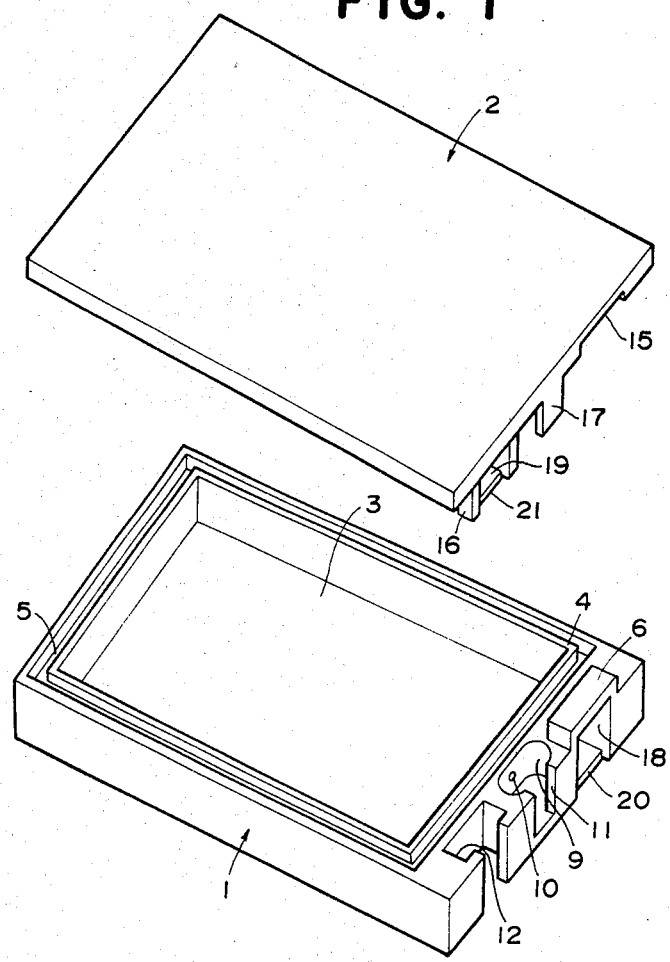
FIG. 1 is a perspective view showing a pair of split cases which constitute a lead storage battery according to an embodiment of the invention (Embodiment 1)
Figure 2A:
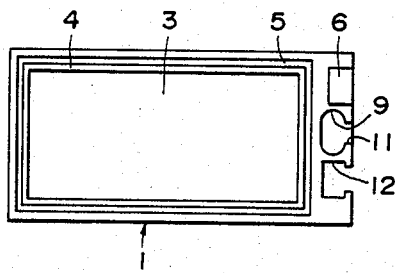
FIGS. 2A and 2B are a plan view and a side view, respectively, showing one split case which constitutes the lead storage battery in the embodiment of FIG. 1.
Figure 2B:
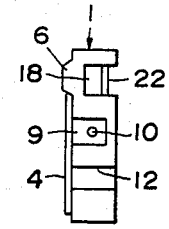
Figure 3A:
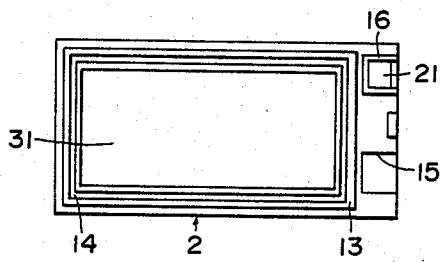
FIGS. 3A and 3B are a plan view and a side view, respectively, showing the other split case which constitutes the lead storage battery according to the embodiment of FIG. 1.
Figure 3B:
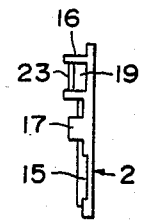

A first embodiment of the present invention will be described below with reference to FIGS. 1 to 4, wherein split cases 1 and 2 (i.e. a tray and a cover for it) that constitute in combination a battery casing for a lead storage battery, and that are obtained by molding a suitable material such as ABS, AS or a polypropylene, or an impact styrol (impact-resistant resin) into a predetermined shape. A recessed portion 3 is formed in the tray 1 to hold battery cells. In the recessed portion 3 for holding the battery cells, there is contained, as a unitary structure, an electro-collecting board (not shown) consisting of a plate-like lead which has a predetermined thickness and which is obtained by punching. One surface of the electro-collecting board and the peripheral portions thereof are covered by the material forming the battery casing. A similar recessed portion 31 is also formed in the other split case, i.e. cover 2, to hold the battery cells. In the recessed portion 31, there is provided, as a unitary structure, an electro-collecting board (not shown) in the same manner as described above. The electro-collecting boards which are formed as a unitary structure in the tray 1 and the cover 2 exhibit reinforcing function. Therefore, thickness of the layers can be reduced in the portion where the electro-collecting boards come into contact with the tray 1 and the cover 2.

A rectangular, framelike rib 4 is formed on the side walls of the recessed portion 3 for holding the battery cells. A frame-like groove 5 is formed between the frame-like rib 4 and the peripheral walls of the tray 1.

A protruding portion 6 for mounting the external terminal is formed on one side of the tray 1 protruding beyond the level of opening thereof. A recessed portion 9 holds a safety valve (not shown), the recessed portion 9 being formed at a central portion on one side of the tray 1. The interior of the battery casing is communicated with the recessed portion 3 for holding the battery cell through a small hole 10 formed in the inner side wall of the battery casing. Further, a groove 11 is formed in the outer side wall of the battery casing. A recessed portion 12 is formed in one side of the tray 1. The recessed portion 9 for holding the safety valve is positioned between the recessed portion 12 and the protruding portion 6 for mounting the external terminal. When the tray 1 and the cover 2 are superposed, the recessed portion 9 for holding the safety valve is covered by the cover 2 to hold the safety valve therein.

A frame-like rib 13 is formed on the cover 2 and will be fitted to the frame-like groove 5 of the tray 1. A frame-like groove 14 is formed inside the frame-like rib 13, and will be fitted to the frame-like rib 4 of the tray 1. A recessed region 15 is formed in the cover 2. When the tray 1 and the cover 2 are superposed, the protruding part 6 for mounting the external terminal of the tray 1 is inserted in the recessed portion 15. A protruding part 16 mounts the external terminal, and is formed on the cover 2. When the tray 1 and the cover 2 are superposed, the protruding part 16 is inserted in the recessed region 12 of the tray 1. A protrusion 17 is formed on the cover 2. When the tray 1 and the cover 2 are superposed, the protrusion 17 is fitted into the groove 11 formed in the tray 1.

Openings 18, 19 are formed in the protruding portions 6, 16 for mounting the external terminals, and top plates 20, 21 are formed at positions slightly depressed from the outer surface of the battery casing. The top plates 20, 21 serve to keep spaces 22, 23 which correspond to the thickness of the external terminals 7, 8.

Figure 4:
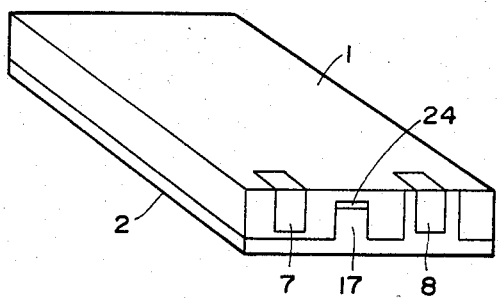
FIG. 4 is a perspective view of the lead storage battery according to the embodiment of FIG. 1, which is assembled.
Figure 5:
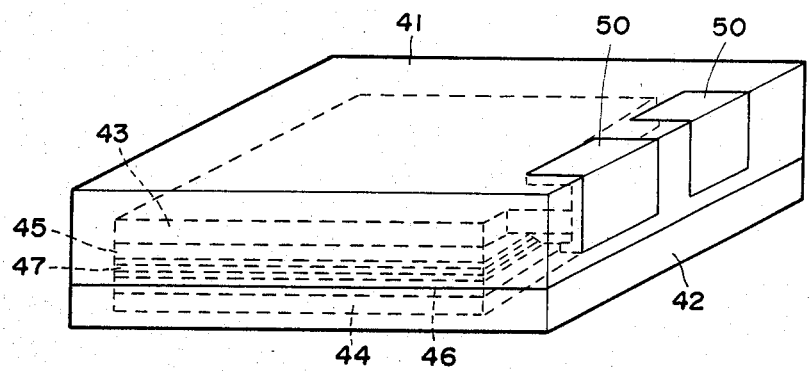
FIG. 5 is a perspective view showing a lead storage battery according to another embodiment (Embodiment 2)
Figure 6A:
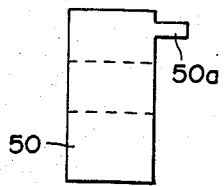
FIGS. 6A, 6B and 6C are an expansion view, a section view, and a perspective view, respectively, of an external terminal used for the lead storage battery of the embodiment of FIG. 5.
Figure 6B:
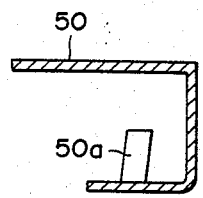
Figure 6C:
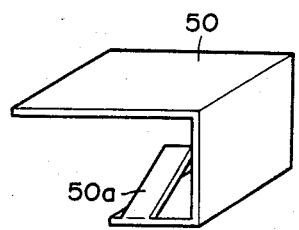

The external terminals 7, 8 are folded in a U-shape, and are spot-welded, prior to superposing the tray 1 and the cover 2, to tabs (not shown) for taking out the electric current of the electro-collecting boards provided in the recessed portions 3, 31 for holding the battery cells in the casing 1, 2. The external terminals 7, 8 are then buried in the spaces 22, 23 and are secured therein to close the openings 18, 19 as shown in FIG. 4.

Described below is how to assemble the lead storage battery according to the first embodiment of the invention.

First, a slurry kneaded material (not shown) composed of an active substance is poured onto surfaces of the electro-collecting boards (not shown) which are disposed in the battery casing of the tray 1 and the cover 2. The slurry kneaded material is then dried to form electrode plates on the surfaces of the electro-collecting boards. Then, a separator (not shown) consisting mainly of a glass fiber is placed on the upper surface of the electrode in the recessed region 3 for holding the battery cells of the tray 1, and an electrolyte of sulfuric acid is poured onto the separator. A tubular safety valve (not shown) made of rubber is inserted in the recessed region 9 for holding the safety valve of the tray 1. Then the tray 1 and the cover 2 are superposed. The protruding parts 6, 16 for mounting external terminals formed on the split cases (tray and cover) 2 are fitted into the recessed regions 15, 12 of the opposing cases relative to each other, and the protrusion 17 formed on the cover 2 is fitted to the groove 11 formed in the recessed region 9 for holding the safety valve of the tray 1. The thus established engagement serves as guide means for superposing the tray 1 and the cover 2, and helps temporarily maintain the tray 1 and the cover 2 in the superposed relation. When the tray 1 and the cover 2 are superposed, the frame-like rib 4 of the tray 1 is fitted to the frame-like groove 14, and the frame-like rib 13 of the cover 2 is fitted to the frame-like groove 5 of the tray 1. With the tray 1 and the cover 2 being superposed, the groove 11 formed in the recessed portion 9 for holding the safety valve of the tray 1 is closed by the protrusion 17 of the cover 2. A small gap 24, however, is maintained between the groove 11 and the protrusion 17. Therefore, the gas produced by the electro-chemical reaction taking place in the battery casing is released out of the battery casing through small hole 10 in the tray 1, recessed region 9 for holding the safety valve, and gap 24.

The battery is completely assembled if frame-like grooves 5, 14 and frame-like ribs 13, 4 of the tray 1 and the cover 2 are joined by ultrasonic welding.

Embodiment 2

Another embodiment of the present invention will be described below with reference to FIGS. 5 to 10. Split cases (tray and cover) that 41, 42 are obtained by molding a synthetic resin such as ABS, polypropylene or the like into a desired shape, and together constitute the battery casing. Electro-collecting boards 43, 44 are made of lead or a lead alloy, and are arranged on the inner surfaces of the split cases 41, 42 with their peripheral portions being molded as a unitary structure. Electrode plates 45, 46 are closely adhered onto the surfaces of the electro-collecting boards 43, 44. A separator 47 is held between the electrode plates 45 and 46 by a predetermined pressure.

A recessed region 48 for mounting the external terminal is formed in an end of the tray 41. The recessed region 48 is formed from the upper surface to the side surface of the tray 41, and has an opening 49 which is formed in the side surfaces thereof and which is communicated with the interior of the tray 41. An external terminal 50 is obtained by folding nearly in a U-shape a flat plate which consists of an electrically conductive metal and which has a short strip 50a at a peripheral portion thereof. The external terminal 50 is secured in the recessed region 48 and is closely adhered thereto. A tab 43a for taking out the electric current stretches from an end of the electro-collecting board 43, and is long enough to be exposed out of the tray 1 penetrating through the opening 49. An epoxy resin 53 is filled in the recessed region 48 for mounting the external terminal 50, and effects the sealing so that the electrolyte in the battery casing will not leak therethrough.

Described below is a procedure for mounting the external terminal on the lead storage battery according to the second embodiment of the invention.

Figure 7A:
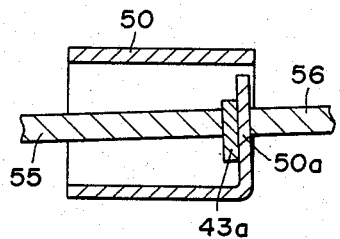
FIG. 7A is a sectional view of a major part where a short strip of the external terminal and a current takeout tab of the electro-collecting board are to be welded together in the lead storage battery of the embodiment of FIG. 5.
Figure 7B:
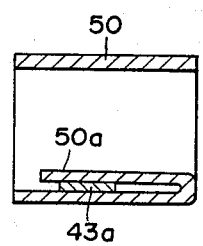
FIG. 7B is a sectional view of a major portion where the short strip has been folded after the welding.
Figure 8:
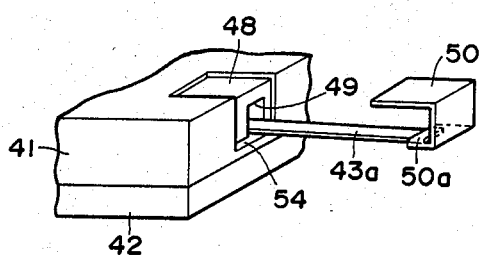
FIG. 8 is a perspective view of a major portion where the external terminal is mounted in the lead storage battery of the embodiment of FIG. 5.
Figure 9:
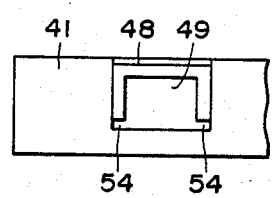
FIG. 9 is a front view of a major region showing the vicinity of an opening formed in the split case for the lead storage battery of the embodiment of FIG. 5.
Figure 10:
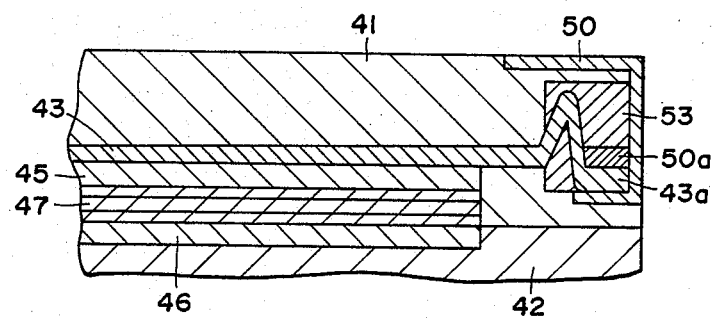
FIG. 10 is a sectional view showing a major portion of the lead storage battery of the embodiment of FIG. 5.
Figure 11:
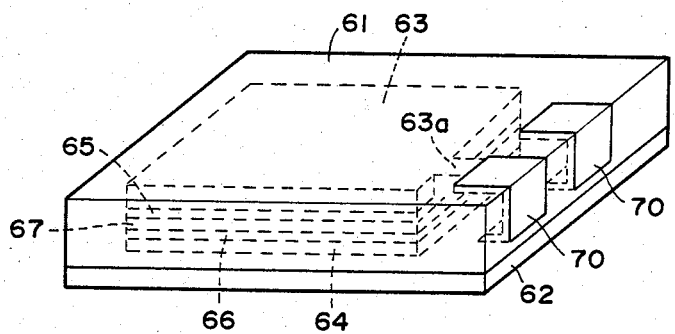
FIG. 11 is a perspective view showing a lead storage battery according to a further embodiment (Embodiment 3)
Figure 12A:
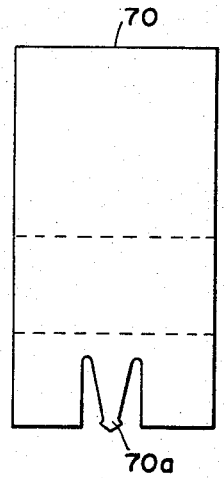
FIGS. 12A and 12B are an expanded view and a perspective view, respectively, of the external terminal used for the lead storage battery of the embodiment of FIG. 11.
Figure 12B:
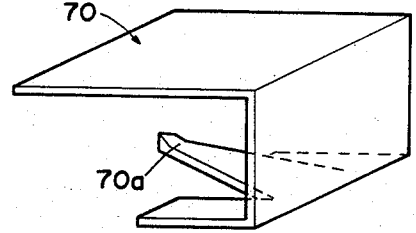

First, an end of the current take-out tabe 43a exposed to the outside through the opening 49 of the split case 41 is spot-welded by welding rods 55, 56 onto the short strip 50a of the external terminal 50 as shown in FIG. 7A. The short strip 50a is then folded toward the inside of the external terminal 50 as shown in FIG. 7B, so that the current take-out tab 43a is held between the short strip 50a and the external terminal 50. The epoxy resin 53 is charged into the recessed region 48 for mounting the external terminal of tray 41 and into the opening 49. The external terminal 50 is fitted into the recessed region 48 before the epoxy resin is hardened, thereby attaching the external terminal 50 thereto. A groove 54 has been formed in the opening 49 of the tray 41 as shown in FIGS. 8, 9, and a part of the external terminal 50 is inserted in the groove 54 so as not to escape therefrom. When the external terminal 50 is fitted as described above, the tab 43a for taking out the current assumes the folded state in the epoxy resin 53 as shown in FIG. 10. After the epoxy resin 53 is set, therefore, the tab 43a for taking out the current is reliably secured to prevent a positional deviation thereof.

Embodiment 3

A third embodiment of the present invention will be described below with reference to FIGS. 11 to 16.

In these drawings, a tray 61 and a cover 62, respectively, are obtained by molding a synthetic resin such as ABS or polypropylene into desired shapes. Electro-collecting boards 63, 64 consist of lead or a lead alloy, and are arranged on the inner surfaces of the tray 61 and the cover 62 with their peripheral regions being molded. Electrode plates 65, 66 are arranged and firmly adhered onto the surfaces of the electro-collecting boards 63, 64. A separator 67 is inserted and pressed between the electrode plates 64 and 66 by a predetermined pressure.

A recessed region 68 for mounting the external terminal is formed in one end of the tray 61. The recessed region 68 is formed from the upper surface to the side surface of the tray 61, and has an opening 69 that is formed in a region in the side surface thereof and that is communicated with the interior of the tray 61. An external terminal 70 is obtained by folding nearly in a U-shape a flat plate which consists of an electrically conductive metal and which has a cutout piece 70a formed at an end thereof. The external terminal 70 is secured in the recessed portion 68 being closely adhered thereto. A tab 63a for taking out the electric current is formed at an end of the electro-collecting board 63 and is placed in the opening 69 in a folded manner. An epoxy resin 73 is filled in a space confined in the recessed portion 68 for mounting the external terminal 70, and effects sealing so that the electrolyte in the battery casing will not leak therethrough.

Described below is a procedure for mounting the external terminal on the lead storage battery according to the third embodiment of the invention.

Figure 13:
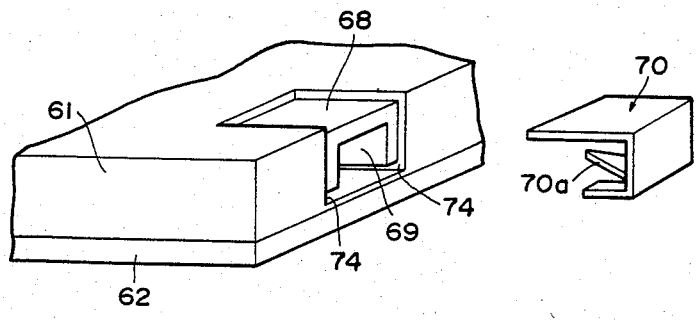
FIG. 13 is a perspective view of a major region showing an opening formed in the split case for the lead storage battery of the embodiment of FIG. 11, and the external terminal.
Figure 14:
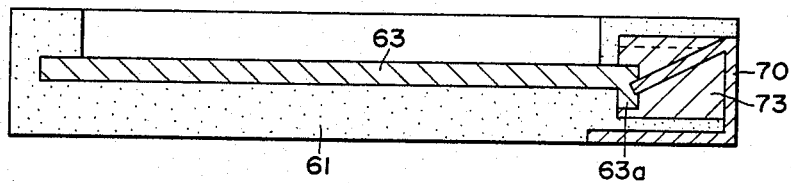
FIG. 14 is a vertical section of the split cases when the external terminal is mounted.
Figure 15:
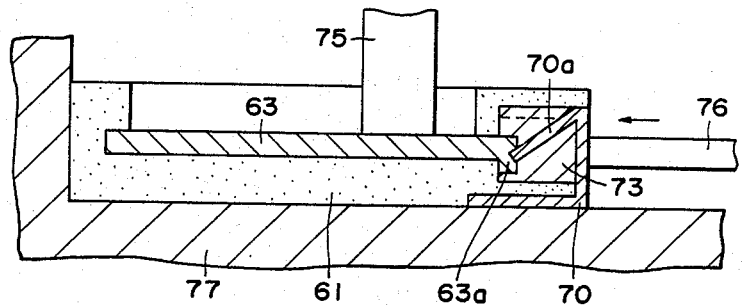
FIG. 15 is a sectional view of a major region with a cutout piece of the external terminal welded to the tab for taking out the electric current of the electro-collecting board.
Figure 16:
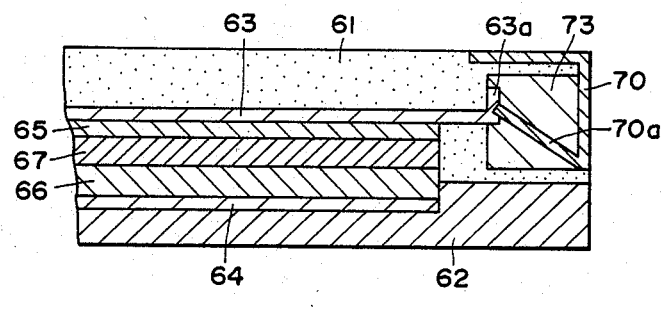
FIG. 16 is a sectional view of a major region showing the lead storage battery of the embodiment of FIG. 11.

First, the epoxy resin 73 is filled up in a sufficient amount around the current take-out tab 63a disposed in the opening 69 of the tray 61, and the external terminal 70 is fitted into the recessed portion 68 such that an end of the cutout piece 70a contacts the current takeout tab 63a. A groove 74 has been formed in the opening 69 as shown in FIG. 13, and a portion of the external terminal is inserted in the groove 74 so as not to slip out therefrom. Next, the tray 61 is placed on a resistance welder, a welding rod 75 is brought into contact with the electro-collecting board 63 arranged in the tray 61, and another welding rod 76 forming a pair with the welding rod 75 is brought into contact with the external terminal 70. In this case, the end of the cutout piece 70a is biased by the welding rod 76 toward the tab for taking out the current. If the power source of the resistance welder 77 is turned on under this condition, electric current flows, in turn, through the circuit consisting of welding rod 75, electro-collecting board 63, current take-out tab 63a, cutout piece 70a, external terminal 70 and welding rod 76, whereby the end of the cutout piece 70a and the current take-out tab 63a are welded together.

Embodiment 4

Figure 17:
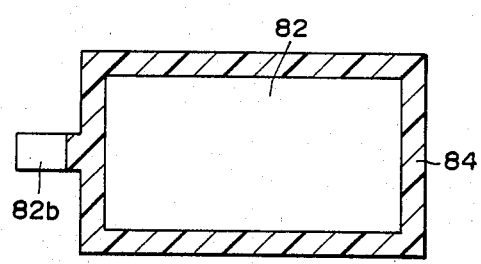
FIG. 17 is a plan view showing the state where silicone rubber is applied to the peripheral portions of the electro-collecting boards for a lead storage battery according to a further embodiment (Embodiment 4)
Figure 18:
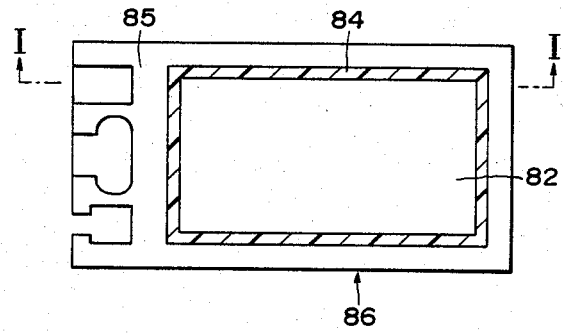
FIG. 18 is a plan view with the electro-collecting board of FIG. 17 formed in the split case as a unitary structure.
Figure 19:
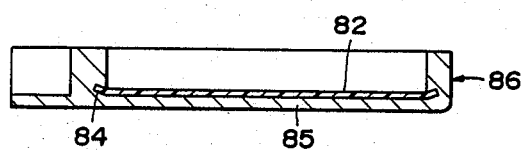
FIG. 19 is a sectional view taken along line I—I of FIG. 18.
Figure 20:
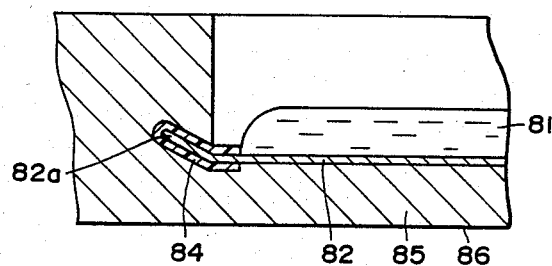
FIG. 20 is a sectional view of a major region of peripheral portions of the electro-collecting board after a slurry kneaded material has been poured.

A further embodiment of the present invention will be described below with reference to FIGS. 17 to 20. A slurry kneaded material 81 is composed of an active material that serves as a cathode after drying, and is prepared by putting into a vessel 75 parts by weight of lead monoxide, 25 parts by weight of trilead tetroxide, 0.2 parts by weight of hydroxypropyl cellulose and 24 parts by weight of water, and by mixing them together using a stirrer for about 5 minutes. An electro-collecting board 82 consists of lead or a lead alloy which is formed by punching, maintaining a size of a unit electrode. The electro-collecting board 82 has a current take-out tab 82b formed as a unitary structure on one side in the lengthwise direction thereof, and which is applied with a silicone rubber 84 on the peripheries thereof as shown in FIG. 17, except a portion of the shape and size (rectangular shape in this embodiment) where the cathode of a predetermined size will be formed. The electro-collecting board 82 which is coated with the silicone rubber 84 is fitted, as shown in FIG. 18, to a rectangular tray 85 by injection molding to obtain a product 86 of a unitary structure, the end 82a at the periphery of the electro-collecting board 82 being bent toward the slurry kneaded material 81 as shown in FIG. 20, and the rectangular tray 85 being obtained by injection-molding a synthetic resin.

Water is poured on the upper surface of the electro-collecting board 82 of the thus obtained unitary product 86, and is then vacuumed off, or otherwise, the unitary product 86 is wholly submerged in water and is taken out. Then, the peripheral portions of the electro-collecting board 82 coated with the silicone rubber 84 repel the water, and the portion not coated with the silicone rubber 84 other than the peripheral portions is wet with water. Therefore, the film of water is formed on the upper surface of the electro-collecting board 82 maintaining the shape of the positive electrode plate that was initially shaped by the silicone rubber 84.

The slurry kneaded material 81 is then poured on the film of water formed on the surface of the electro-collecting board 82. The slurry kneaded material 81 smoothly spreads out on the water film until it contacts the silicone rubber 84 along the periphery of the electro-collecting board 82. Then, the water contained in the slurry kneaded material 81 evaporates. Thus, there is obtained a cathode body having a three-layer construction consisting of tray, electro-collecting board, and positive electrode plate with the positive electrode plate adhering closely onto the surface of the electro-collecting board 82.

A negative electrode body is also obtained in the same manner as described above but using a different active material that forms the slurry kneaded material, and a different additive in different amounts. The positive electrode body and the negative electrode body are then coupled via a separator (not shown), and the tray and the cover are joined by ultrasonic welding to complete the lead storage battery of the invention.

With the end at the periphery of the electro-collecting board being folded as mentioned above, the probability of marring the appearance of the battery casing by the warping at the time of molding is reduced, and the production efficiency of the battery casings is increased by more than 20%. This increase is attributed to the fact that the end at the periphery of the electro-collecting board which is folded helps increase the structural resistance to contraction of the resin in the battery casing.

Figure 21:
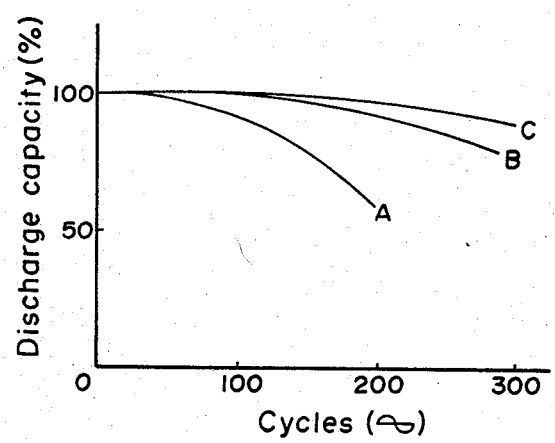
FIG. 21 is a graph of the change in the battery discharge capacity in the charge-discharge cycles with conventional lead storage batteries and the lead storage battery of the embodiment of FIG. 17.
Figure 22:
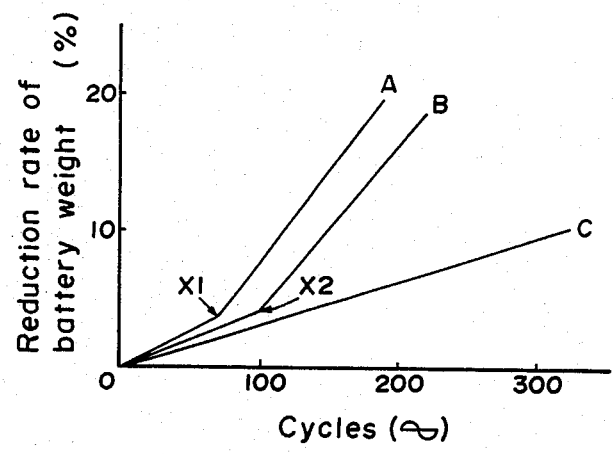
FIG. 22 is a graph of reduction rates of battery weight in the charge-discharge cycles with the lead storage batteries referred to in FIG. 21.

Described below with reference to FIGS. 21, 22 is the extent to which battery life can be extended by folding the peripheral end of the electro-collecting board and by applying a water-repellent coating composed of silicone rubber to the periphery of the electro-collecting board, as in the fourth embodiment (FIGS. 17–20).

FIG. 21 shows relations between the charge-discharge cycles and the battery discharge capacity. Conventional lead storage batteries in which the peripheral end of the electro-collecting board is not folded and in which the water-repellent coating composed of silicone rubber is not applied, exhibit battery discharge capacities that can be approximated by a curve A, and that vary greatly between the curve B and a curve C. In contrast, the lead storage batteries according to the invention, in which the peripheral end of the electro-collecting board is folded, exhibit battery discharge capacities that vary within a very narrow, limited range between curve B and curve C. Further, the lead storage batteries of the present invention in which the peripheral end of the electro-collecting board is folded and in which the water-repellent coating composed of silicone rubber is applied, exhibit battery discharge capacities that are represented by the curve C.

FIG. 22 shows relations between the charge-discharge cycles and the reduction rate of battery weight. With conventional lead storage batteries, the reduction ratios of battery weight greatly vary between a folded line A and a straight line C. With the lead storage batteries in which the peripheral end of the electro-collecting board is folded, the reduction ratios of battery weight lie between a folded line B and the straight line C. With the lead storage batteries in which the peripheral end of the electro-collecting board is folded and the water-repellent composed of silicone rubber is applied, the reduction ratios of battery weight are represented by the straight line C. In FIG. 22, inclination of the folded lines A, B increases at boundaries X1, X2, presumably due to the fact that the electrolyte had infiltrated onto the surface of the electro-collecting board on the side of the battery casing in the battery cycles, and the sealing function of the battery is destroyed at the points X1, X2. To investigate it, the batteries were disassembled, and it was noticed that the batteries in which the electrolyte permeates in large amounts onto the surfaces of the electro-collecting board on the side of the battery casing, exhibit charge-discharge cycle characteristics that are close to the curve A or the folded line A in FIGS. 21, 22. A correlation was confirmed that variance in the battery discharge capacity increases in proportion to the amount of the electrolyte which permeates the electro-collecting board.

According to the fourth embodiment of FIGS. 17–20, furthermore, distinguished functions and effects are obtained as described below owing to the combination of a water-repellent or hydrophobic coating applied to the peripheral portions of the electro-collecting board, the electrode-forming portion of the electro-collecting board which is wetted with water, and the slurry kneaded material of an active material poured on the surface of the electrode-forming portion. Namely, the kneaded slurry poured on the surface of the electro-collecting board comes into contact with water on the electro-collecting board and, at the same time, spreads horizontally to quickly form a plane surface. At the peripheries of the electro-collecting board, the kneaded slurry is repelled by the water-repellent or hydrophobic material, and is prevented from spreading any further. Consequently, there is formed a layer of active material in a shape surrounded by the water-repellent or hydrophobic material. It is evident that a layer of active material of any shape can be formed on any place on the surface of the electro-collecting board by simply pouring a slurry kneaded material thereon. Furthermore, even when the batteries constructed are very small, by employing electrodes of a size smaller than the inner diameter of the battery casings to avoid the probability of short-circuit around the electrodes, it is allowed to easily form in the central portions of the battery casings electrodes of a size which is smaller than the inner size of the battery casings.

Whereas the invention has been disclosed with reference to a particular embodiment, the same is not to be considered as limited to this embodiment, but its scope extends to the obvious changes and modifications that will be evident to those skilled in the art.

What is claimed is:

1. A lead storage battery comprising:
    a battery casing having an interior, battery cells therein, a first case member and a second case member in a superposed relation;
    a pair of recessed regions, one arranged in the first case member and the other arranged in the second case member, for mounting external terminals;
    said pair of recessed regions having openings for leading electro-conductive tabs therethrough to electrically connect the battery cells in said battery casing to said external terminals; and
    said external terminals are electrically connected in said openings with said electro-conductive tabs and are embedded in said pair of recessed regions.

2. A lead storage battery according to claim 1, wherein:
    said first case member includes, in said recessed region thereof, a protruding part for mounting one external terminal; and
    said second case member includes, in said recessed region thereof, a protruding part for mounting another external terminal.

3. A lead storage battery according to claim 1, wherein said recessed region arranged in the first case member holds a safety valve covered by said second case member when the first and second case members are superposed; and
    said recessed region has a small hole formed therein and connected with the interior of said battery casing.

4. A lead storage battery according to claim 3, wherein a groove is formed between said recessed region and an outer wall of said first case member, and said second case member has a projection for covering said groove.

5. A lead storage battery according to claim 4, wherein a small gap is formed between said groove and said projection.

6. A lead storage battery according to claim 1, wherein:
    said electro-conductive tabs are faced into said openings of said recessed regions,
    said external terminals are formed by folding a flat plate in nearly a U-shape, and
    said external terminals are mounted in the recessed regions so as to cover said openings.

7. A lead storage battery according to claim 6, wherein:
    each of said external terminals has a cutout piece which is in contact with said electro-conductive tab, and
    said cutout piece and said tab are welded together.

8. A lead storage battery according to claim 1, wherein:
    said first case member and said second case member are made of a synthetic resin,
    an electro-collecting board is provided in each of the first and second case members,
    said electro-collecting board is molded at its periphery in said first case member and said second case member, and
    peripheral ends of said electro-collecting boards are bent toward the interior of said battery casing.

9. A lead storage battery according to claim 8, wherein a water-repellent coating is applied onto the periphery of said electro-collecting boards.

* * * * *